United States Patent
Nagae (10) Patent No.: US 8,234,866 B2
(45) Date of Patent: Aug. 7, 2012

(54) EXHAUST GAS RECIRCULATION SYSTEM OF INTERNAL COMBUSTION ENGINE HAVING A PURIFICATION APPARATUS BREAKAGE DETECTION UNIT

(75) Inventor: Masahiro Nagae, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 762 days.

(21) Appl. No.: 12/373,686

(22) PCT Filed: Jul. 12, 2007

(86) PCT No.: PCT/JP2007/064289
§ 371 (c)(1),
(2), (4) Date: Jan. 13, 2009

(87) PCT Pub. No.: WO2008/007808
PCT Pub. Date: Jan. 17, 2008

(65) Prior Publication Data
US 2011/0048001 A1    Mar. 3, 2011

(30) Foreign Application Priority Data
Jul. 14, 2006    (JP) .................................. 2006-193916

(51) Int. Cl.
*F02M 25/07* (2006.01)
(52) U.S. Cl. .............. 60/605.2; 60/278; 60/279; 60/280
(58) Field of Classification Search ................. 60/605.2, 60/278, 279, 280; F02M 25/07
See application file for complete search history.

(56) References Cited

U.S. PATENT DOCUMENTS

| 5,647,205 | A | * | 7/1997 | Wier et al. | ...................... 60/274 |
| 2002/0196153 | A1 | * | 12/2002 | Kinugawa et al. | ............ 340/606 |
| 2005/0115222 | A1 | | 6/2005 | Blomquist et al. | |
| 2005/0178272 | A1 | * | 8/2005 | Kariya et al. | ................... 96/421 |

(Continued)

FOREIGN PATENT DOCUMENTS

DE    101 13 449 A1    9/2001
(Continued)

OTHER PUBLICATIONS

Japanese Office Action for corresponding Japanese Patent Application No. 2009-519134 mailed Aug. 31, 2010.

*Primary Examiner* — Quyen Leung
*Assistant Examiner* — Michael Andrews
(74) *Attorney, Agent, or Firm* — Sughrue Mion, PLLC (57) ABSTRACT

An object of the present invention is to provide a technology of preventing, in an exhaust gas recirculation system having a low pressure EGR passage that recirculates a part of the exhaust gas from the exhaust passage at some point downstream of the exhaust gas purification apparatus to the intake passage, fragments of the exhaust gas purification apparatus from entering the intake system through the low pressure EGR passage in case that breakage of the exhaust gas purification apparatus occurs. The inventive system has a low pressure EGR valve provided in the low pressure EGR passage, an EGR control unit (S101-S103) for recirculating exhaust gas to the intake passage by opening the low pressure EGR valve, and a breakage detection unit (S104-S107) for detecting breakage of the exhaust gas purification apparatus. When breakage of the exhaust gas purification apparatus is detected, the low pressure EGR valve is closed (S108).

1 Claim, 3 Drawing Sheets

U.S. PATENT DOCUMENTS

2007/0068157 A1 * 3/2007 Kurtz .......................... 60/605.2
2008/0041035 A1   2/2008 Sawada et al.

FOREIGN PATENT DOCUMENTS

| | | |
|---|---|---|
| JP | 09-88727 A | 3/1997 |
| JP | 2002-371827 A | 12/2002 |
| JP | 2004-150319 A | 5/2004 |
| JP | 2005-226519 A | 8/2005 |
| JP | 2007-092755 A | 4/2007 |
| WO | 03/067044 A1 | 8/2003 |
| WO | 2005/124118 A1 | 12/2005 |

* cited by examiner

EXHAUST GAS RECIRCULATION SYSTEM OF INTERNAL COMBUSTION ENGINE HAVING A PURIFICATION APPARATUS BREAKAGE DETECTION UNIT

CROSS REFERENCE TO RELATED APPLICATION

This application is the national phase application under 35 U.S.C. §371 of PCT international application No. PCT/JP2007/064289 filed on 12 Jul. 2007, which claims priority to Japanese patent application No. 2006-193916 filed on 14 Jul. 2006, the contents of which are incorporated herein by reference.

TECHNICAL FIELD

The present invention relates to an exhaust gas recirculation (EGR) system of an internal combustion engine.

BACKGROUND ART

An exhaust gas recirculation (EGR) system that recirculates a portion of the exhaust gas to an intake passage is known as a technique to reduce the amount of NOx contained in the exhaust gas discharged from an internal combustion engine. For example, Japanese Patent Application Laid-Open No. 2004-150319 discloses an exhaust gas recirculation system of an internal combustion engine that is provided with a low-pressure EGR passage that connects the exhaust passage downstream of the turbine of the turbocharger and the intake passage upstream of the compressor of the turbocharger and a high-pressure EGR passage that connects the exhaust passage upstream of the turbine and the intake passage downstream of the compressor. The low-pressure EGR passage and the high pressure EGR passage are switched over selectively, or used simultaneously in accordance with operating conditions of the internal combustion engine.

According to a known technology, in an internal combustion engine that is equipped with a particulate filter (which will be simply referred to as a filter, hereinafter) for trapping particulate matter contained in the exhaust gas discharged from the internal combustion engine, a processing of regenerating the ability of trapping particulate matter is performed by increasing the temperature of the filter to oxidize and remove the particulate matter deposited on the filter. (Such a processing will be hereinafter referred to as regeneration processing).

Japanese Patent Application Laid-Open No. 2002-371827 and Japanese Patent Application Laid-Open No. 2005-226519 teach to detect breakage of a filter provided in an internal combustion engine based on a difference between the pressure in the upstream of the filter and the pressure in the downstream of the filter.

Japanese Patent Application Laid-Open No. 09-088727 teaches to provide a net at some point in the intake passage, in the EGR passage or in the exhaust passage between the filter and the intercooler to thereby prevent fragments of a filter or a catalyst from entering the internal combustion engine.

DISCLOSURE OF THE INVENTION

At times of performing filter regeneration processing or at times of hard acceleration, oxidation reaction of particulate matter may sometimes proceeds rapidly in a limited part of the filter to cause a local abrupt rise in the temperature of the filter. When a local abrupt temperature rise of the filter occurs, a difference in the degree of thermal expansion between the portion in which the abrupt temperature rise occurs and the surrounding thereof is generated, which sometimes causes breakage, such as cracking, of the filter. When such breakage of the filter occurs, a part of the filter can be chipped off from the filter as a fragment, in the worst case.

In an exhaust gas recirculation system in which a low pressure EGR passage is connected to the exhaust gas passage at some point downstream of an exhaust gas purification apparatus such as a filter, if such breakage of the filter occurs when a portion of the exhaust gas recirculates into the intake passage through the low pressure EGR passage, there is a possibility that fragments of the broken filter enter the low pressure EGR passage. Therefore, if breakage of the filter occurs when recirculation of exhaust gas through the low pressure EGR passage is performed, there is a risk that fragments of broken filter enter the intake passage through the low pressure EGR passage to cause malfunction of a component such as a compressor or an intercooler in the intake system or the internal combustion engine itself.

The present invention has been made in view of the above mentioned problems and has as an object to provide a technology of preventing, in an exhaust gas recirculation system having a low pressure EGR passage that is adapted to recirculate exhaust gas from the exhaust passage at some point downstream of the exhaust gas purification apparatus to the intake passage, fragments of the exhaust gas purification apparatus from entering the intake system in case that breakage of the exhaust gas purification apparatus occurs.

To achieve the above object, an exhaust gas recirculation system of an internal combustion engine according to the present invention is provided with a turbocharger having a turbine provided in an exhaust passage of the internal combustion engine and a compressor provided in an intake passage of the internal combustion engine, an exhaust gas purification apparatus provided in the exhaust passage downstream of said turbine, an EGR passage that connects the exhaust passage downstream of said exhaust gas purification apparatus and the intake passage upstream of said compressor, an EGR valve provided in said EGR passage for changing the channel cross section of the EGR passage, an EGR control unit for recirculating, when the internal combustion engine is in a predetermined operating state, a part of exhaust gas from the internal combustion engine to the intake passage by controlling said EGR valve in the valve opening direction, and a breakage detection unit for detecting breakage of said exhaust gas purification apparatus, wherein when breakage of said exhaust gas purification apparatus is detected by said breakage detection unit, said EGR control unit closes said EGR valve to stop recirculation of exhaust gas through said EGR passage even if the internal combustion engine is in said predetermined operating state.

According to this arrangement, when the internal combustion engine is in the predetermined operating state, recirculation of the exhaust gas is performed through the EGR passage. The predetermined operating state is determined in advance. While recirculation of the exhaust gas through the EGR passage is being performed, the EGR valve is controlled in the valve opening direction. However, when breakage of the exhaust gas purification apparatus is detected by the breakage detection unit, the EGR valve is closed, and recirculation of the exhaust gas through the EGR passage is stopped, even when the internal combustion engine is in the above-described predetermined operating state.

By this feature, even in the case where fragments chipped off from the broken exhaust gas purification apparatus enter the EGR passage, the fragments are prevented from passing through the EGR passage to enter the intake passage. Consequently, malfunction of the intake system such as the compressor or the internal combustion engine can be prevented from being caused by the fragments of the broken exhaust gas purification apparatus.

In the present invention, the breakage detection unit can detect breakage of the exhaust gas purification apparatus based on the temperature of the exhaust gas purification apparatus. Specifically, in the above described arrangement of the present invention, a temperature detection unit for detecting the temperature of the exhaust gas purification apparatus may further be provided, and said breakage detection unit may determine that said exhaust gas purification apparatus is broken, if the temperature detected by said temperature detection unit is higher than a predetermined temperature.

Here, the predetermined temperature is such a temperature at which there is a risk that breakage of the exhaust gas purification apparatus can occur. The predetermined temperature is determined in advance by, for example, experiments.

In the present invention, the breakage detection unit can detect breakage of the exhaust gas purification apparatus based on pressure loss in the exhaust gas purification apparatus. Specifically, in the above described arrangement of the present invention, a pressure loss detection unit for detecting pressure loss in said exhaust gas purification apparatus and a normal time pressure loss estimation unit for estimating pressure loss in said exhaust gas purification apparatus that is supposed to occur under the assumption that said exhaust gas purification apparatus is not broken may further be provided, and said breakage detection unit may determine that said exhaust gas purification apparatus is broken, if the pressure loss detected by said pressure loss detection unit is smaller than the pressure loss estimated by said normal time pressure loss estimation unit.

Here, the pressure loss in the exhaust gas purification apparatus means the pressure difference between the upstream and downstream of the exhaust gas purification apparatus. When breakage such as cracking of the exhaust gas purification apparatus occurs and/or a broken part is chipped off from the exhaust gas purification apparatus, the resistance of the exhaust gas purification apparatus against the flow of the exhaust gas decreases. Accordingly, under the same operating condition, the pressure loss in the broken exhaust gas purification apparatus is likely to be smaller than that in the unbroken exhaust gas purification apparatus that is working properly. Therefore, if the pressure loss in the exhaust gas purification apparatus actually detected in a certain operating state is smaller than the pressure loss supposed to be detected in the unbroken exhaust gas purification apparatus in the same operating state, it may be determined that the exhaust gas purification apparatus is broken.

The present invention can also be applied to an exhaust gas recirculation system of an internal combustion engine further provided with a high pressure EGR passage that connects the exhaust passage upstream of said turbine and the intake passage downstream of said compressor, and a high pressure EGR valve provided in said high pressure EGR passage for changing the channel cross section of said high pressure EGR passage, in addition to the above described components.

In the case of the exhaust gas recirculation system having such a structure, said EGR control unit may comprise a unit for recirculating, when the internal combustion engine is in a second predetermined operating state, a part of exhaust gas from the internal combustion engine to the intake passage by at least controlling said EGR valve in the valve opening direction.

In other words, when the internal combustion engine is in the second predetermined operating state, recirculation of the exhaust gas is performed through the EGR passage or through both the EGR passage and the high pressure EGR passage.

When breakage of said exhaust gas purification apparatus is detected by said breakage detection unit, the EGR control unit may close the EGR valve to stop at least recirculation of exhaust gas through said EGR passage, even if the internal combustion engine is in said second predetermined operating state.

As per the above, if the operating state of the internal combustion engine at the time when breakage of the exhaust gas purification apparatus is detected is an operating state in which recirculation of the exhaust gas through the EGR passage is prescribed to be performed, the EGR valve is closed to stop the recirculation of the exhaust gas through the EGR passage. The system may be designed as follows: if the operating state of the internal combustion engine at the time when breakage of the exhaust gas purification apparatus is detected is an operating state in which recirculation of the exhaust gas through the EGR passage and the high pressure EGR passage is prescribed to be performed, only the EGR valve is closed to stop only the recirculation of the exhaust gas through the EGR passage and the high pressure EGR valve is not closed to allow the recirculation of the exhaust gas through the high pressure EGR passage to go on. Alternatively, the EGR valve and the high pressure EGR valve may be closed to stop both the recirculation of the exhaust gas through the EGR passage and the recirculation of the exhaust gas through the high pressure EGR passage.

According to the above described arrangement, when breakage of the exhaust gas purification apparatus is detected, at least recirculation of the exhaust gas through the EGR passage that is provided to tap the exhaust gas from the exhaust passage at a point downstream of the exhaust gas purification apparatus is stopped. Thus, even if fragments of the broken exhaust gas purification apparatus enter the EGR passage from the exhaust passage, the fragments are prevented from passing through the EGR passage to enter the intake passage. Therefore, malfunction of the intake system such as the compressor or the internal combustion engine can be prevented from being caused by the fragments of the broken exhaust gas purification apparatus.

In this embodiment, when breakage of the exhaust gas purification apparatus is forecast or when a sign of breakage of the exhaust gas purification apparatus is detected, at least the EGR valve may be closed to stop recirculation of the exhaust gas through the EGR passage. Specifically, an exhaust gas recirculation system of an internal combustion engine according to another aspect of the present invention may comprise a turbocharger having a turbine provided in an exhaust passage of the internal combustion engine and a compressor provided in an intake passage of the internal combustion engine, an exhaust gas purification apparatus provided in the exhaust passage downstream of said turbine, an EGR passage that connects the exhaust passage downstream of said exhaust gas purification apparatus and the intake passage upstream of said compressor, an EGR valve provided in said EGR passage for changing the channel cross section of the EGR passage, an EGR control unit for recirculating, when the internal combustion engine is in a predetermined operating state, a part of exhaust gas from the internal combustion engine to the intake passage by controlling said EGR valve in the valve opening direction, and a breakage forecast unit for forecasting breakage of said exhaust gas purification apparatus and/or detecting a sign of breakage of said exhaust gas purification apparatus, wherein when breakage of said exhaust gas purification apparatus is forecast or a sign of breakage of said exhaust gas purification apparatus is detected by said breakage forecast unit, said EGR control unit may close said EGR valve to stop recirculation of exhaust gas through said EGR passage even if the internal combustion engine is in said predetermined operating state.

According to this arrangement, the EGR valve can be preliminarily closed before breakage of the exhaust gas purification apparatus actually occurs. Thus, when breakage of the exhaust gas purification apparatus occurs, fragments thereof can be prevented from passing through the EGR passage to enter the intake passage with improved reliability.

In the above described arrangement, a temperature detection unit for detecting the temperature of said exhaust gas purification apparatus may further be provided, and said breakage forecast unit may comprise a unit for forecasting breakage of said exhaust gas purification apparatus and/or detecting a sign of breakage of said exhaust gas purification apparatus based on the temperature of said exhaust gas purification apparatus detected by said temperature detection unit.

Breakage of the exhaust gas purification apparatus may be forecast or a sign of breakage of the exhaust gas purification apparatus may be detected based on, for example, the temperature of the exhaust gas purification apparatus or the history (i.e. change with time) of the temperature of the exhaust gas purification apparatus.

In the above described arrangement, pressure loss detection means for detecting pressure loss in said exhaust gas purification apparatus may further be provided, and said breakage forecast unit may forecast breakage of said exhaust gas purification apparatus or detect a sign of breakage of said exhaust gas purification apparatus based on the pressure loss detected by said pressure loss detection unit.

Breakage of the exhaust gas purification apparatus may be forecast or a sign of breakage of the exhaust gas purification apparatus may be detected based on, for example, the pressure difference between the upstream and downstream of the exhaust gas purification apparatus or the history (i.e. change with time) of the pressure difference between the upstream and downstream of the exhaust gas purification apparatus.

The above arrangement of the present invention can also be applied to an exhaust gas recirculation system equipped with a high pressure EGR passage. Specifically, a high pressure EGR passage that connects the exhaust passage upstream of said turbine and the intake passage downstream of said compressor and a high pressure EGR valve provided in said high pressure EGR passage for changing the channel cross section of said high pressure EGR passage may also be provided in addition to the above-described components, and said EGR control unit may comprise a unit for recirculating, when the internal combustion engine is in a second predetermined operating state, a part of the exhaust gas from the internal combustion engine to the intake passage by at least controlling said EGR valve in the valve opening direction, and when breakage of said exhaust gas purification apparatus is forecast and/or a sign of breakage of said exhaust gas purification apparatus is detected by said breakage forecast unit, the EGR control unit may close said EGR valve to stop at least recirculation of exhaust gas through said EGR passage, even if the internal combustion engine is in said second predetermined operating state.

BEST MODE FOR CARRYING OUT THE INVENTION

In the following, the best mode for carrying out the present invention will be described in detail by way of example. It should be understood that the dimensions, materials, shapes and relative positions etc. of the components of the embodiment descried herein are not intended to limit the technical scope of the present invention, unless otherwise specified.

First Embodiment

Figure 1:
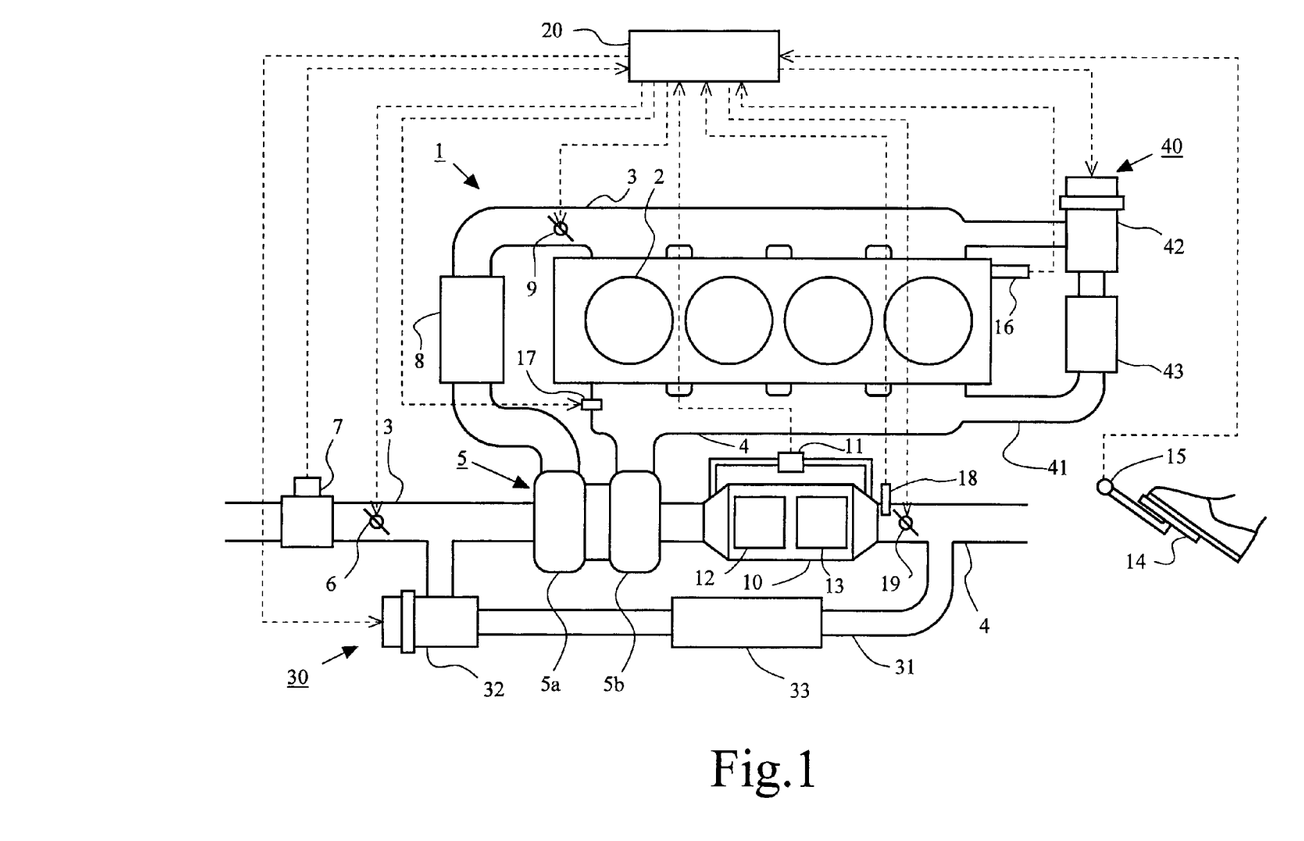
FIG. 1 is a diagram schematically showing the general structure of the internal combustion engine to which an exhaust gas recirculation system according to a first embodiment is applied and its air-intake and exhaust systems.

FIG. 1 shows the general structure of an internal combustion engine to which the exhaust gas recirculation system according to the embodiment is applied and its air-intake and exhaust systems. The internal combustion engine 1 shown in FIG. 1 is a water-cooled, four-cycle diesel engine having four cylinders 2.

To the internal combustion engine 1 are connected an intake pipe 3 and an exhaust pipe 4. In the intake pipe 3 is provided a second intake throttle valve 9 for regulating the flow rate of the intake air flowing in the intake pipe 3. The second intake throttle valve 9 is opened and closed by an electric actuator. The intake pipe 3 is provided with an intercooler 8 disposed upstream of the second intake throttle valve 9.

The intake pipe 3 is provided with a compressor housing 5a of a turbocharger 5 disposed upstream of the intercooler 8. The turbocharger 5 operates utilizing the energy of the exhaust gas as the drive source. A first throttle valve 6 that regulates the flow rate of the intake air flowing in the intake pipe 3 is provided in the intake pipe 3 upstream of the compressor housing 5a.

The first intake throttle valve 6 is opened and closed by an electric actuator. An air flow meter 7 that outputs a signal indicative of the flow rate of the air flowing into the intake pipe 3 is provided in the intake pipe 3 upstream of the first intake throttle valve 6. The quantity of air drawn into the internal combustion engine 1 is measured by the air flow meter 7.

On the other hand, the exhaust pipe 4 is provided with a fuel addition valve 17 that adds fuel into the exhaust gas flowing in the exhaust pipe 4. The exhaust pipe 4 is provided with a turbine housing 5b of the turbocharger 5 disposed downstream of the fuel addition valve 17. The exhaust pipe 4 is also provided with an exhaust gas purification apparatus 10 disposed downstream of the turbine housing 5b.

The exhaust gas purification apparatus 10 has an oxidation catalyst 12 and a particulate filter 13 (which will be simply referred to as a filter, hereinafter) disposed subsequent to the oxidation catalyst 12. A NOx storage reduction catalyst (which will be hereinafter referred to as a NOx catalyst) is supported on the filter 13. The filter 13 traps particulate matter contained in the exhaust gas. The NOx catalyst stores nitrogen oxides in the exhaust gas when the oxygen concentration in the exhaust gas flowing into the NOx catalyst is high, while it releases NOx stored therein when the oxygen concentration in the exhaust gas flowing into it becomes low. If there are reducing components such as hydrocarbons (HC) and carbon monoxide (CO) in the exhaust gas in the surrounding of the NOx catalyst when NOx is released from the NOx catalyst, the NOx released from the NOx catalyst is reduced into, for example, $N_2$.

The filter 13 is equipped with a pressure difference sensor 11 that measures the pressure difference between the upstream and downstream of the filter 13. The amount of particulate matter deposited on the filter 13 can be estimated based on the pressure difference across the filter 13 detected by the pressure difference sensor 11.

A temperature sensor 18 for measuring the temperature of the exhaust gas flowing out of the exhaust gas purification apparatus 10 is provided in the exhaust pipe 4 just downstream of the exhaust gas purification apparatus 10. The temperature of the filter 13 can be estimated based on the temperature of the exhaust gas measured by the temperature sensor 18.

An exhaust throttle valve 19 that regulates the flow rate of the exhaust gas flowing in the exhaust pipe 4 is provided in the exhaust pipe 4 downstream of the exhaust gas purification apparatus 10. The exhaust throttle valve 19 is opened and closed by an electric actuator.

The internal combustion engine 1 is equipped with a low pressure EGR apparatus 30 that recirculates a part of the exhaust gas flowing in the exhaust pipe 4 to the intake pipe 3 at low pressure. The low pressure EGR apparatus 30 has a low pressure EGR pipe 31, a low pressure EGR valve 32 and a low pressure EGR cooler 33.

The low pressure EGR pipe 31 connects the exhaust pipe 4 downstream of the exhaust throttle valve 19 and the intake pipe 3 upstream of the compressor housing 5a and downstream of the first intake throttle valve 6. A part of the exhaust gas is recirculated to the intake pipe 3 through the low pressure EGR pipe 31 at low pressure. In this embodiment, the exhaust gas recirculated to the intake pipe 3 through the low pressure EGR pipe 31 will be referred to as the "low pressure EGR gas".

The low pressure EGR valve 32 is adapted to regulate the quantity of the low pressure EGR gas flowing in the low pressure EGR pipe 31 by changing the channel cross section of the low pressure EGR pipe 31. The low pressure EGR cooler 33 reduces the temperature of the low pressure EGR gas by causing heat exchange between the low pressure EGR gas passing through the low pressure EGR cooler 33 and the cooling water of the internal combustion engine 1.

The internal combustion engine 1 is also equipped with a high pressure EGR apparatus 40 that recirculates a part of the exhaust gas flowing in the exhaust pipe 4 to the intake pipe 3 at high pressure. The high pressure EGR apparatus 40 has a high pressure EGR pipe 41, a high pressure EGR valve 42 and a high pressure EGR cooler 43.

The high pressure EGR pipe 41 connects the exhaust pipe 4 upstream of the turbine housing 5b and the intake pipe 3 downstream of the second intake throttle valve 9. A part of the exhaust gas is recirculated to the intake pipe 3 through the high pressure EGR pipe 41 at high pressure. In this embodiment, the exhaust gas recirculated to the intake pipe 3 through the high pressure EGR pipe 41 will be referred to as the "high pressure EGR gas".

The high pressure EGR valve 42 is adapted to regulate the quantity of the high pressure EGR gas flowing in the high pressure EGR pipe 41 by changing the channel cross section of the high pressure EGR pipe 41. The high pressure EGR cooler 43 reduces the temperature of the high pressure EGR gas by causing heat exchange between the high pressure EGR gas passing through the high pressure EGR cooler 43 and the cooling water of the internal combustion engine 1.

To the internal combustion engine 1 having the above descried structure is annexed an ECU 20 or an electronic control unit that controls the internal combustion engine 1. The ECU 20 is a computer that controls the operating state of the internal combustion engine 1 according to operating conditions of the internal combustion engine 1 and driver's demands.

The ECU 20 is connected, through electric wiring, an accelerator position sensor 15 that outputs an electric signal indicative of the amount of depression of the accelerator pedal 14 depressed by the driver and a crank position sensor 16 as well as the aforementioned pressure difference sensor 11 and the temperature sensor 18. The output signals from these sensors are adapted to be input to the ECU 20. The engine load can be computed based on the output signal from the accelerator position sensor 15. The engine rotation speed can be computed based on the output signal from the crank position sensor 16.

The ECU 20 is also connected, through electric wiring, with the first intake throttle valve 6, the second intake throttle valve 9, the exhaust throttle valve 19, the low pressure EGR valve 32, the high pressure EGR valve 42 and the fuel addition valve 17. These components are controlled by the ECU 20.

In the following, recirculation of the exhaust gas performed using the low pressure EGR apparatus 30 and the high pressure EGR apparatus 40 according to this embodiment will be described. Operating conditions of the internal combustion engine in which recirculation of the exhaust gas can be performed preferably by the low pressure EGR apparatus 30 and the operating conditions of the internal combustion engine in which recirculation of the exhaust gas can be performed preferably by the high pressure EGR apparatus 40 are determined respectively in advance by, for example, experiments. In this embodiment, the low pressure EGR apparatus 30 and the high pressure EGR apparatus 40 are switched over selectively or used simultaneously according to the operating state of the internal combustion engine to perform recirculation of the exhaust gas.

Figure 2:
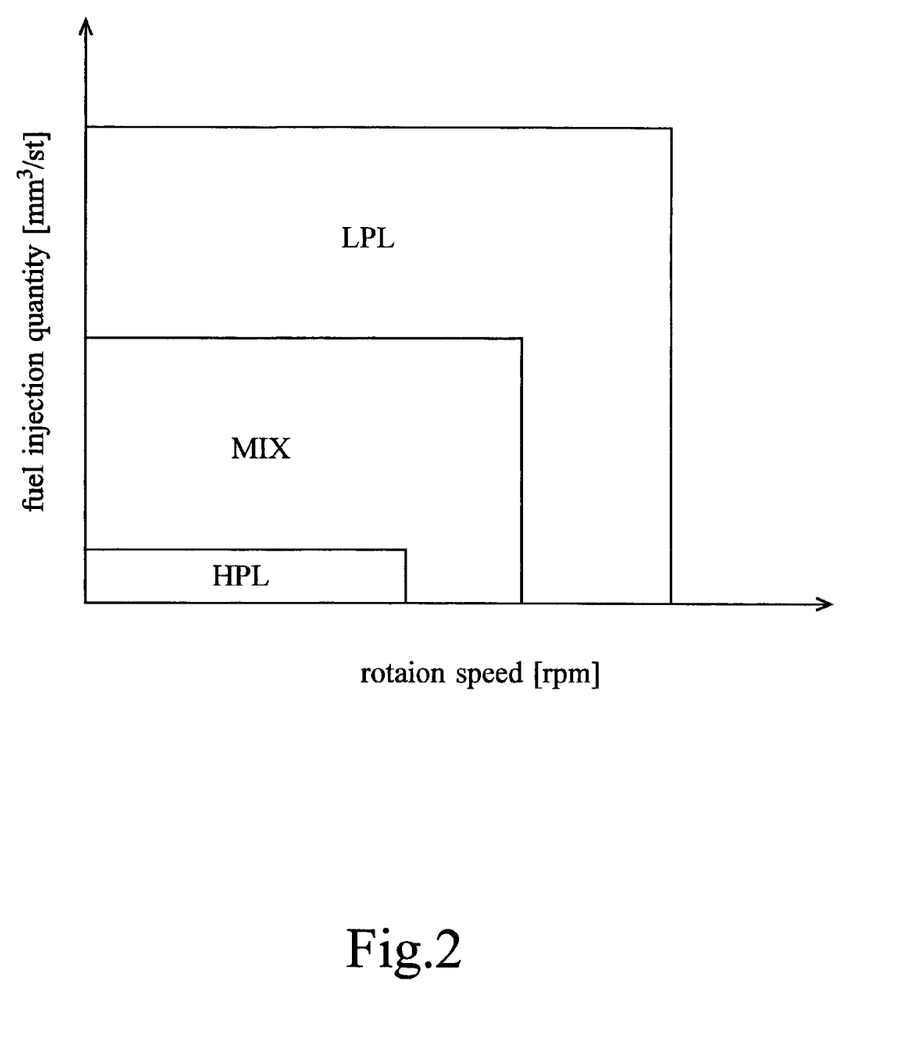
FIG. 2 is a map of basic control of a low pressure EGR apparatus and a high pressure EGR apparatus in the first embodiment.

FIG. 2 is a map representing basic control of the low pressure EGR apparatus 30 and the high pressure EGR apparatus 40 determined for each region of the operating state of the internal combustion engine 1. The horizontal axis of FIG. 2 represents the engine rotation speed of the internal combustion engine 1, and the vertical axis represents the fuel injection quantity of the internal combustion engine 1. The fuel injection quantity is a parameter representing the engine load of the internal combustion engine 1.

In FIG. 2, in the region designated by "HPL" (which will be hereinafter referred to as the HPL EGR region) in which the internal combustion engine 1 is in low-load and low-rotation-speed operating states, the high pressure EGR apparatus 40 is used to perform recirculation of the exhaust gas. In the region designated by "MIX" in FIG. 2 (which will be hereinafter referred to as the MIX EGR region) in which the internal combustion engine 1 is in intermediate-load and/or intermediate-rotation-speed operating states, both the high pressure EGR apparatus 40 and low pressure EGR apparatus 30 are used simultaneously to perform recirculation of the exhaust gas. In the region designated by "LPL" in FIG. 2 (which will be hereinafter referred to as the LPL EGR region) in which the internal combustion engine 1 is in high-load and/or high-rotation-speed operating states, the low pressure EGR apparatus 30 is used to perform recirculation of the exhaust gas. In the region in which the rotation speed and/or the load are higher than the upper bounds of the LPL EGR region, recirculation of the exhaust gas is not performed.

In each of the above mentioned regions, a basic value of the degree of opening of the low pressure EGR valve 32 (which will be sometimes referred to as the "basic low pressure EGR valve opening degree", hereinafter) and a basic value of the degree of opening of the high pressure EGR valve 42 (which will be sometimes referred to as the "basic high pressure EGR valve opening degree") are set so that a target EGR rate corresponding to the operating state of the internal combustion engine 1 is achieved. The ECU 20 reads-in the basic low pressure EGR opening degree and the basic high pressure EGR valve opening degree according to the operating state of the internal combustion engine 1 set as above. The ECU 20 then controls the low pressure EGR valve 32 so that the degree of opening of the low pressure EGR valve 32 becomes equal to the basic low pressure EGR valve opening degree and controls the high pressure EGR valve 42 so that the degree of opening of the high pressure EGR valve 42 becomes equal to the basic high pressure EGR valve opening degree.

By using the high pressure EGR apparatus 40 and the low pressure EGR apparatus 30 selectively or simultaneously according to the operating state of the internal combustion engine 1 in recirculating the exhaust gas, recirculation of the exhaust gas can be performed over wide ranges of operating state of the internal combustion engine 1. This enables to reduce the amount of NOx emitted from the internal combustion engine 1 over wide ranges of operating state of the internal combustion engine 1.

In this embodiment, if the target EGR rate is not reached even when the low pressure EGR valve 32 is fully opened, the first intake throttle valve 6 is operated in the valve closing direction. Operating the first intake throttle valve 6 in the valve closing direction leads to an increase in the pressure difference between the upstream and downstream of the low pressure EGR pipe 31, and accordingly the quantity of the low pressure EGR gas can be increased. Since the operating environment temperature of the first intake throttle valve 6 is relatively low, the degree of opening of the first intake throttle valve 6 can be controlled with high accuracy.

When processing of regenerating the ability of trapping particulate matter is performed by oxidizing and removing particulate matter deposited on the filter 13 (which will be hereinafter referred to as regeneration processing) or when the temperature of the exhaust gas from the internal combustion engine rises abruptly due to hard acceleration or other reason, oxidation reaction of particulate matter may sometimes proceeds rapidly in a limited part in the filter 13 to cause a local abrupt rise in the temperature of the filter 13. When a local abrupt temperature rise of the filter occurs, a difference in the degree of thermal expansion between the portion in which the abrupt temperature rise occurs and the surrounding thereof is generated, which sometimes causes breakage, such as cracking, of the filter 13. When such breakage of the filter 13 occurs, a part of the filter 13 can be chipped off from the filter as a fragment, in the worst case.

For this reason, if breakage of the filter 13 occurs when recirculation of the exhaust gas through the low pressure EGR pipe 31 is performed, namely when the operating state of the internal combustion engine 1 is in the LPL EGR region or MIX EGR region in FIG. 2, there is a risk that fragments of the broken filter 13 may enter the intake pipe 3 through the low pressure EGR pipe 31 to damage the intake system such as the compressor in the compressor housing 5a and the intercooler 8 or the internal combustion engine 1.

In view of the above, in this embodiment, a determination is made as to whether or not the filter 13 is broken, and if it is determined that the filter 13 is broken, the low pressure EGR valve 32 is closed to stop recirculation of the exhaust gas by the low pressure EGR apparatus 30, even when the operating state of the internal combustion engine 1 falls within the LPL EGR region or MIX EGR region. Thus, even in the situation where the filter 13 is broken and there is a possibility that fragments of the broken filter 13 enter the low pressure EGR pipe 31, the fragments of the filter 13 can be prevented from entering the intake pipe 3 through the low pressure EGR pipe 31 by closing the low pressure EGR valve 32. Therefore, damaging of the air intake system and the internal combustion engine 1 can be prevented from occurring.

Figure 3:
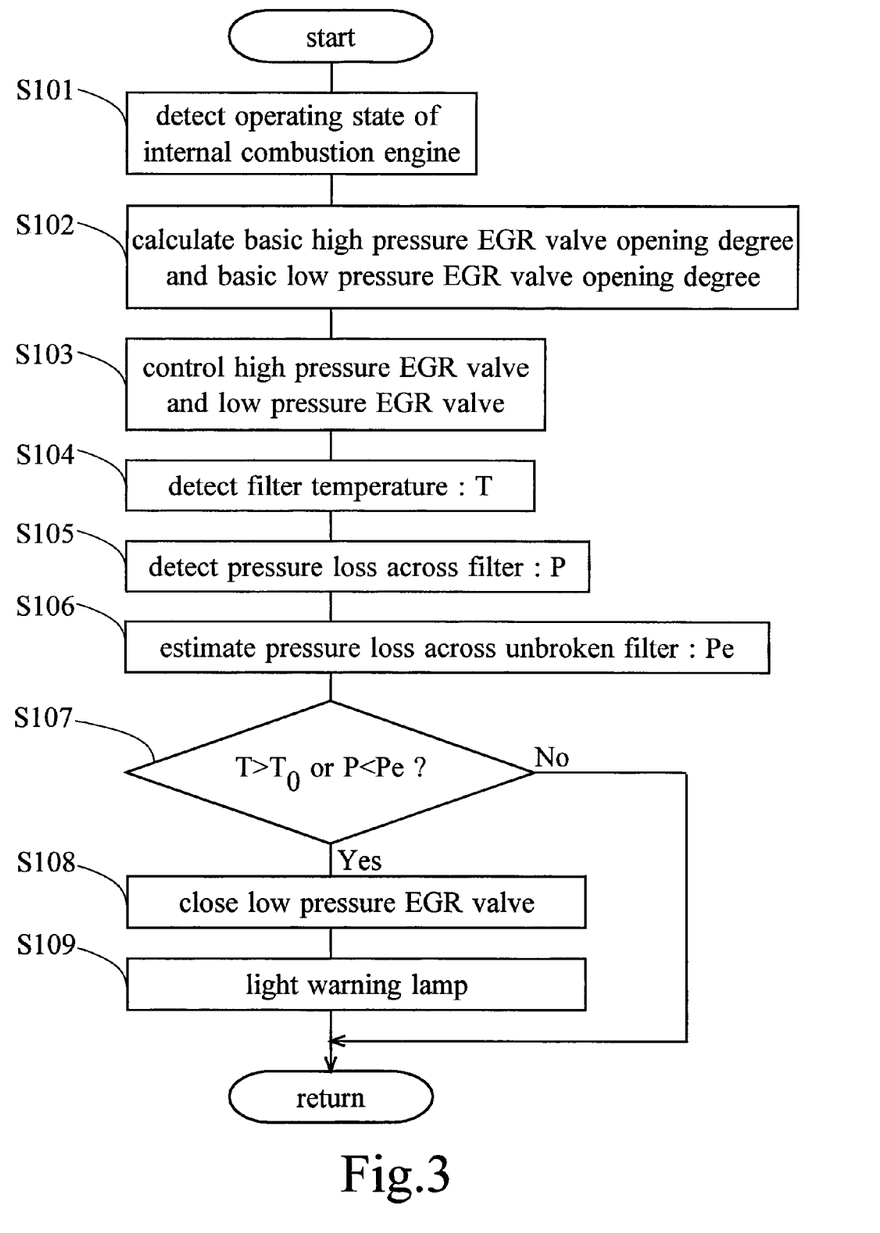
FIG. 3 is a flow chart of an EGR control routine in the first embodiment.

In the following, the EGR control adapted to breakage of the filter 13 as described above will be described with reference to a flow chart of FIG. 3. FIG. 3 is a flow chart of an EGR control routine adapted to breakage of the filter 13 according to this embodiment. This routine is executed repeatedly.

First in step S101, the ECU 20 detects the operating state of the internal combustion engine 1. Specifically, the ECU 20 computes the engine load of the internal combustion engine 1 based on the output signal from the accelerator position sensor 15 and the engine rotation speed of the internal combustion engine 1 based on the output signal from the crank position sensor 16.

Then in step S102, the ECU 20 obtains the basic high pressure EGR valve opening degree and the basic low pressure EGR valve opening degree corresponding to the operating state of the internal combustion engine 1 detected in step S101. More specifically, the ECU 20 obtains them based on a relation such as a function or a map that specifies the basic high pressure EGR valve opening degree and the basic low pressure EGR valve opening degree in relation to the engine load and engine rotation speed of the internal combustion engine 1. The relationship between the engine load and engine rotation speed and the basic high pressure EGR valve opening degree and the relationship between the engine load and engine rotation speed and the basic low pressure EGR valve opening degree are determined in advance by, for example, experiments.

Then in step S103, the ECU 20 controls the high pressure EGR valve 42 so that the degree of opening thereof becomes equal to the basic high pressure EGR valve opening degree obtained in step S102, and controls the low pressure EGR valve 32 so that the degree of opening thereof becomes equal to the basic low pressure EGR valve opening degree obtained in step S102.

Then in step S104, the ECU 20 obtains the temperature T of the filter 13. Specifically, the ECU 20 estimates the temperature T of the filter 13 based on the temperature of the exhaust gas measured by the temperature sensor 18 at point just downstream of the exhaust gas purification apparatus 10.

Then in step S105, the ECU 20 obtains the pressure loss P across the filter 13. Specifically, the ECU 20 determines the pressure difference between the upstream and downstream of the filter 13 using the pressure difference sensor 11.

Then in step S106, the ECU 20 obtains the pressure loss Pe that is supposed to occur in the filter 13 under the assumption that the filter 13 is not broken. Specifically, the ECU 20 obtains the pressure loss Pe using a function or map for calculating the pressure loss Pe in the filter 13 that is not broken from the intake air quantity detected by the air flow meter 7, the operating time elapsed since the last execution of regeneration processing for the filter 13 and the EGR rate of the intake air. Such a function or map is prepared in advance by, for example, experiments.

Then in step S107, the ECU 20 determines whether or not the filter 13 is broken. Specifically, if the temperature T of the filter 13 obtained in step 104 is higher than a predetermined temperature $T_0$ and/or it is determined that the actually measured value P of the pressure loss in the filter 13 obtained in step S105 is lower than the estimated value Pe of the pressure loss in the unbroken filter 13 obtained in step S106, it is determined that the filter 13 is broken. Here, the predetermined temperature $T_0$ is a temperature at which excessive temperature rise of the filter 13 can occur. The predetermined temperature $T_0$ is determined in advance by, for example, experiments.

If it is determined in step S107 that the filter 13 is broken, the process of the ECU 20 proceeds to step S108, where the low pressure EGR valve 32 is closed to stop recirculation of the exhaust gas by the low pressure EGR apparatus 30. Then the process proceeds to step S109, where a warning lamp that informs the driver of breakage of the filter 13 is lit, and execution of this routine is once terminated.

On the other hand, if it is determined in step S107 that the filter 13 is not broken, the ECU 20 once terminates execution of this routine and continues the normal EGR control.

The above embodiment of the present invention has been described by way of example, and various modifications can be made thereto without departing from the spirit and scope of the present invention. For example, although in the above described embodiment of the present invention is applied to an exhaust gas recirculation system having a high pressure EGR apparatus 40 and a low pressure EGR apparatus 30, the present invention can also be applied to an exhaust gas recirculation system having only a low pressure EGR apparatus 30. In this case, if breakage of the filter 13 is detected, the low pressure EGR valve 32 is closed to stop recirculation of the exhaust gas by the low pressure EGR apparatus 30 even when the operating state of the internal combustion engine 1 falls within the operating region in which recirculation of the exhaust gas by the low pressure EGR apparatus 30 is to be performed.

Although in the above described embodiment recirculation of the exhaust gas by the low pressure EGR apparatus 30 is stopped when breakage of the filter 13 is detected, recirculation of the exhaust gas by the low pressure EGR apparatus 30 may be stopped when breakage of the filter 13 is forecast to occur or a sign of breakage of the filter 13 is detected. In connection with this, breakage of the filter 13 may be forecast based on factors such as the temperature of the filter 13, the pressure difference across the filter 13 and/or history of these values.

Although in this embodiment the exhaust throttle valve 19 is disposed in the exhaust pipe 4 downstream of the exhaust gas purification apparatus 10 and upstream of the point at which the low pressure EGR pipe 31 branches therefrom, the exhaust throttle valve may be located in the exhaust pipe 4 downstream of the point at which the low pressure EGR pipe 31 branches therefrom. In this case, throttling the exhaust throttle valve causes a rise in the pressure difference between the upstream and downstream of the low pressure EGR pipe 31, whereby the quantity of low pressure EGR gas can be increased.

A net may further be provided at a position near the point of connection of the low pressure EGR pipe 31 and the exhaust pipe 4. With this arrangement, when breakage of the filter 13 occurs, fragments of the filter 13 can be prevented from entering the low pressure EGR pipe 31, and accordingly they are prevented from entering the air-intake system and the internal combustion engine 1 with improved reliability.

The exhaust throttle valve may be opened when breakage of the filter 13 occurs. This prevents the exhaust throttle valve from being clogged with fragments of the broken filter 13.

INDUSTRIAL APPLICABILITY

According to the present invention, when breakage of the exhaust gas purification apparatus occurs, fragments of the broken exhaust gas purification apparatus can be prevented from passing through an EGR passage to enter the intake passage, and accordingly malfunction of the air-intake system including a compressor of a turbocharger and the internal combustion engine can be prevented from occurring.

The invention claimed is:

1. An exhaust gas recirculation system of an internal combustion engine comprising:
    a turbocharger having a turbine provided in an exhaust passage of the internal combustion engine and a compressor provided in an intake passage of the internal combustion engine;
    an exhaust gas purification apparatus provided in the exhaust passage downstream of said turbine;
    a low pressure EGR passage that connects the exhaust passage downstream of said exhaust gas purification apparatus and the intake passage upstream of said compressor;
    a low pressure EGR valve provided in said low pressure EGR passage for changing the channel cross section of the low pressure EGR passage;
    a high pressure EGR passage that connects the exhaust passage upstream of said turbine and the intake passage downstream of said compressor; and
    a high pressure EGR valve provided in said high pressure EGR passage for changing the channel cross section of said high pressure EGR passage;
    a detection unit configured to detect the temperature of said exhaust gas purification apparatus or configured to detect the pressure loss in said exhaust gas purification apparatus;
    a breakage forecast unit configured to forecast breakage of said exhaust gas purification apparatus,
    said breakage forecast unit configured to forecast breakage of said exhaust gas purification apparatus based on the history and/or the change with time of the temperature of said exhaust gas purification apparatus detected by said detection unit; or
    said breakage forecast unit configured to forecast breakage of said exhaust gas purification apparatus based on the history and/or the change with time of the pressure loss in said exhaust gas purification apparatus detected by said pressure loss detection unit;
    an EGR control unit configured to recirculate, when the internal combustion engine is in a predetermined operating state, a part of exhaust gas from the internal combustion engine to the intake passage by at least controlling said low pressure EGR valve in the valve opening direction, and configured to close, when breakage of said exhaust gas purification apparatus is forecast by said breakage forecast unit, said low pressure EGR valve to stop at least recirculation of exhaust gas through said low pressure EGR passage even if the internal combustion engine is in said predetermined operating state.

\* \* \* \* \*